Feb. 22, 1938.  E. R. CREAMER  2,108,981
MOLDED CORE STRIP
Filed June 14, 1935
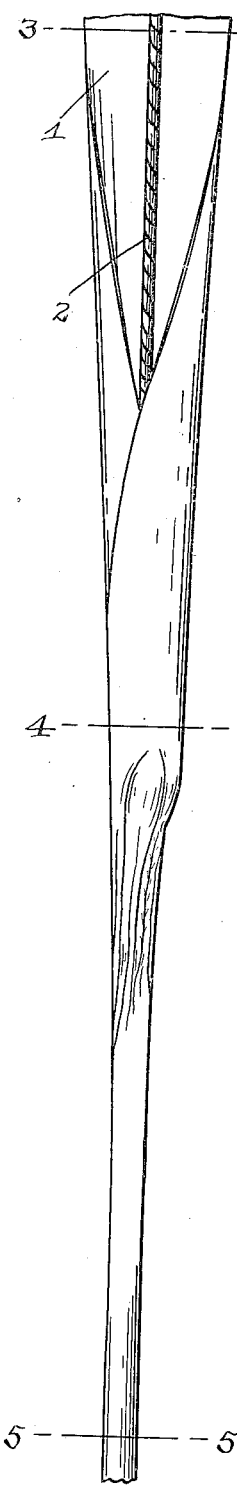
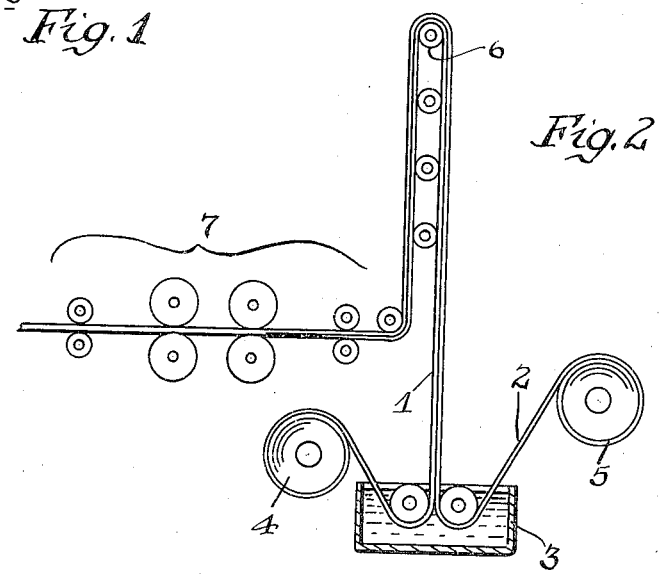
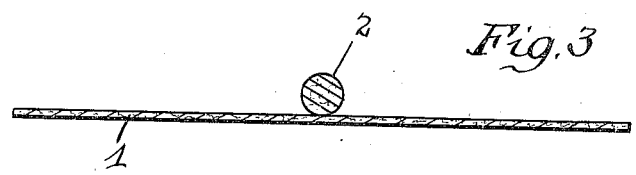
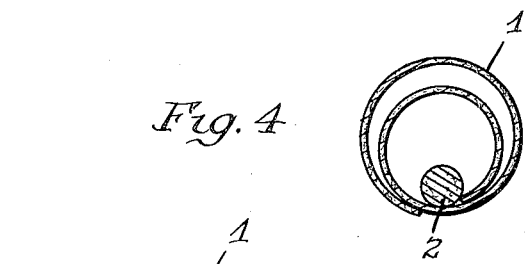
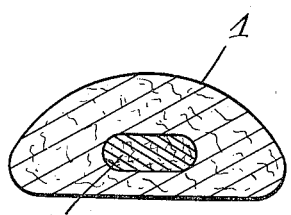
INVENTOR
Edgar R. Creamer
BY
his ATTORNEY Patented Feb. 22, 1938

2,108,981

UNITED STATES PATENT OFFICE 2,108,981

MOLDED CORE STRIP

Edgar R. Creamer, Detroit, Mich., assignor to The George R. Carter Company, Detroit, Mich., a corporation of Michigan Application June 14, 1935, Serial No. 26,644

3 Claims. (Cl. 154—2)

In the manufacture of textile and similar trimming strips, such as are used as finishings for upholstery and coach work, there are used filler strips or cores of inferior or less expensive material to produce beads and other body conformations, the same being completely covered and concealed. Cheapness coupled with some tensile strength and accompanied by ability to bend transversely to a reasonable extent without wholly breaking, so that a fracture is discernible through the covering, are the considerations to be met in the production of a filler core of this type. My present invention has for its object to produce a filler core possessing these last mentioned advantages, the improvements being directed in general to a method of forming and molding the cheapest sort of paper material about a central strengthening element that is also inexpensive in a substantially homogeneous mass.

To these and other ends, the invention resides in certain improvements and combinations of parts, all as will be hereinafter more fully described, the novel features being pointed out in the claims at the end of this specification.

In the drawing:

Fig. 1 is a plan view of a broken length of core filler constructed in accordance with and illustrating one embodiment of my invention, the length comprising progressively, as in the method of making, the assembling of the parts, the forming thereof and the final molding of the completed article;

Fig. 2 is a diagrammatic view of machine elements illustrative of the method steps of assembling, forming and molding;

Fig. 3 is an enlarged cross section of the assembly, taken on the line 3—3 of Fig. 1;

Fig. 4 is a cross section at the formative period taken on the line 4—4 of Fig. 1 on the same scale, and Fig. 5 is an enlarged cross section of the finished product taken on the line 5—5 of Fig. 1.

Similar reference numerals throughout the several views indicate the same parts.

The type of trimming, in the making of which my present invention may be used to advantage, is illustrated in general in the prior patent to myself and another, No. 1,387,639, dated August 16, 1921, and entitled Molding for upholstering, wherein the corresponding core there shown is indicated at 5.

Referring more particularly to the drawing herein, the paper used in the method is a single continuous strip 1 of a width depending upon the size of the finished product desired. It may be made from ground wood pulp or sulphite pulp, sulphate pulp, reclaimed waste papers or the combining of any or all of these. This paper is given a starch treatment, preferably, by the mill to insure a certain degree of stiffness and strength. In the presence of an adhesive, a cord 2 is laid centrally and longitudinally of the flat paper strip and, after drying or partial drying of the adhesive, the edges of the paper are curled in and preliminarily wrapped laterally around the cord in somewhat the manner of Fig. 4, which figure is perhaps diagrammatically too precise but illustrates the general desired result of encompassing or enclosing the cord with layers of the paper brought from the two edges. The cord itself is preferably composed of twisted strands of sulphite kraft paper, which has tensile strength, a high fiber density and lateral flexibility. As the method continues beyond this curving of this paper around the cord by a progressive folding action, the strip is formed under strong pressure into the homogeneous mass shown in Fig. 5 with the cord imbedded solidly in the center and the exterior finally molded to the transverse contour desired, such as the half round shape illustrated.

A machine set up for accomplishing these steps is outlined in Fig. 2, where 3 indicates a bath of Latex or similar fluid adhesive, 4 a feeding off supply of paper 1 thereto and 5 a feeding off supply of cord 2. The elements are, with the use of suitable guide rolls brought together in the bath and conveyed thence in the relationship of Fig. 3 up over a drying rack 6, that may have heated air driven against it to hasten the drying action. The dried composite is thence run through a group of forming compressing and molding rolls, indicated collectively at 7, to perform the previously described successive operations which transform the materials from the condition of Fig. 3 to that of Fig. 5. The machine forms no part of my invention and is composed of well known instrumentalities that one skilled in the art may select without difficulty.

At this point, the filler core is structurally complete, but it is my practice to accumulate it on racks behind the trim forming machine and, after another Latex bath application and subsequent drying, it goes directly into its position as core or filler in the decorative trimming.

A filler core constructed in accordance with my invention as herein described can be produced at an exceedingly low cost by a rapid and continuous process. It is weather resistant and will bend sufficiently in both lateral directions to be conformed to the turns about window frames and if, in a difficult place of application, the outer body is weakened or cracked, the tough inner cord will still maintain its continuity and so supported that the damage will not be detected through the covering.

I claim as my invention:

1. The method of making a molded core strip as a filler for trimming of the character described which embodies running a strip of paper and a cord concomitantly to contact through an adhesive bath, guiding them together thence to a drier and drying them so that they adhere to each other and become a unit, passing the unit through forming rolls and curling the edges of the paper inwardly over the cord and finally crushing the curled paper about the latter so that paper and cord constitute a homogeneous hard and bendable mass with the cord lying substantially centrally thereof.

2. The method of making a molded core strip as a filler for trimming of the character described which embodies running a strip of ordinary sulphite paper and a round twisted paper cord concomitantly to contact through an adhesive bath, guiding them thence together to a drier and drying them so that they adhere to each other and become a unit with the cord lying centrally of the paper strip, passing the unit through forming rolls and curling the edges of the paper inwardly over the cord and finally crushing the curled paper about the latter so that paper strip and paper cord constitute a homogeneous, relative hard but bendable mass with the cord lying substantially centrally thereof.

3. As an article of paper manufacture, a molded core strip for use as a filler for trimming of the character described comprising a relatively hard but bendable homogeneous paper mass embodying a substantially central twisted and inextensible paper cord and a surrounding body composed of an adhesive and a paper strip whose edges have been curled inwardly about the cord and the strip then crushed compactly about the latter to a final form in which it is thinner at the edges so that it will bend in the general plane of said edges around the cord on a short radius without buckling the entire assembly, the surrounding body being for such purpose slightly compressible but possessing little or no tensile strength.

EDGAR R. CREAMER.